United States Patent [19]

Okawa

[11] Patent Number: 4,511,029
[45] Date of Patent: Apr. 16, 1985

[54] APPARATUS FOR TRANSFERRING ARTICLES

[75] Inventor: Masao Okawa, Niihama, Japan

[73] Assignee: Sumitomo Heavy Industries, Ltd., Tokyo, Japan

[21] Appl. No.: 421,342

[22] Filed: Sep. 22, 1982

[30] Foreign Application Priority Data

Sep. 28, 1981 [JP] Japan ............................. 56-153306

[51] Int. Cl.³ .......................................... B65G 25/00
[52] U.S. Cl. ........................................... 198/621
[58] Field of Search .............. 198/621, 744, 855, 774; 414/750, 751

[56] References Cited

U.S. PATENT DOCUMENTS

| | | | |
|---|---|---|---|
| 2,191,143 | 2/1940 | Hiatt et al. | 414/751 |
| 2,665,013 | 1/1954 | Socke | 414/751 |
| 2,818,963 | 1/1958 | Buigne | 198/621 |
| 2,862,634 | 12/1958 | Chalich | 414/751 |
| 2,909,265 | 10/1959 | Buigne | 198/621 |
| 3,143,217 | 8/1964 | Andersen | 414/750 |
| 3,422,657 | 1/1969 | Grombka et al. | 72/405 |
| 3,456,814 | 7/1969 | Bantz | 198/621 |
| 4,279,561 | 7/1981 | Schneider et al. | 414/751 |
| 4,284,381 | 8/1981 | Minato | 414/751 |
| 4,349,309 | 9/1982 | Minnetti | 414/751 |
| 4,462,521 | 7/1984 | Takagi | 198/621 |

FOREIGN PATENT DOCUMENTS 2717567 10/1978 Fed. Rep. of Germany ...... 414/750

Primary Examiner—Joseph E. Valenza
Assistant Examiner—Daniel R. Alexander
Attorney, Agent, or Firm—Armstrong, Nikaido Marmelstein & Kubovcik

[57] ABSTRACT

An apparatus for transferring articles suitable for use in combination with a press in which a pair of parallel feed bars, each having clamping jaws or claws are moved three dimensionally to transfer blanks sequentially through a series of die stations. The apparatus has a pair of movable frames each mounting two carriers from which the feed bars are suspended one from each carrier. The carriers on each movable frame are adapted to be moved toward and away from each other by the operation of fluid-operated clamp/unclamp cylinders mounted on the movable frame thereby to make the jaws or claws clamp and unclamp the blanks. The feed bars are movable also in the longitudinal directions thereof by fluid-operated advance/return cylinders associated with the movable frames, and also up and down by fluid operated lift/down cylinders mounted on the carriers.

4 Claims, 7 Drawing Figures

APPARATUS FOR TRANSFERRING ARTICLES

BACKGROUND OF THE INVENTION

This invention relates generally to apparatus for transferring articles and more particularly to an improvement of a transfer machine used in combination with a press in which a pair of parallel feed bars are provided for three dimensional movements to automatically transfer blanks sequentially through a series of die stations of the press in each of which the blank is progressively worked.

A conventional transfer machine of the type described has a driving section disposed at each lateral side of the press. Each of the driving sections includes various mechanical elements such as cams, levers and shafts which in cooperation drive the feed bars three dimensionally. Each driving section occupies an impractically large space impeding the transfer of the billets into the press, as well as the transfer of the forged products to the outside of the press. This in turn requires an impractically complicated construction of the devices for transferring the billets and products, often resulting in various troubles and difficulty in the maintenance.

The large distance between the driving sections from the lateral side surfaces of the press requires a correspondingly large length of the feed bars, resulting in an increase of the weight of the same. This also markedly increases the size of the transfer machine, because the operation speed and the weights of the parts constituting the feed bar system are the primary factors which determine the required strength of the driving system of the transfer machine.

This large length of the feed bars causes vibration of the machine particularly when the operation speed is high.

For these reasons, there is an increasing demand for an apparatus structure that provides a reduction in the weight and length of the feed bars.

SUMMARY OF THE INVENTION

Accordingly, it is a primary object of the invention to provide a transfer machine of the kind described, in which the driving section makes use of fluid pressure to realize a compact transfer machine, thereby to overcome the above-described problems of the prior art.

To this end, according to the invention, there is provided an apparatus for transferring articles comprising: a stationary main frame; a pair of substantially parallel feed bars; at least one pair of opposed jaws or claws adapted to hold the article therebetween, each jaw or claw being provided on each feed bar; a pair of movable frames, each being movable with respect to the main frame in a plane in parallel with a plane in which the feed bars extend and including a pair of first beams extending in parallel with the feed bars and a pair of second beams extending perpendicularly to and securely fixed at their ends to the first beams; a pair of means mounted on the main frame for guiding the first beams, respectively, of each movable frame to move the movable frame in the direction in parallel with the feed bars; a pair of carriers movably supported on the second beams of each movable frame for movement in the direction pependicular to the movement of the movable frame; a supporting member movably supported on the carrier for movement in the direction perpendicular to the plane and securely supporting each end of each feed bar; at least one first fluid-operated cylinder for driving at least one of the movable frames; a second fluid-operated cylinder for driving each carrier; and a third fluid-operated cylinder for driving each supporting member.

According to a preferred form of the invention, the guide means comprises a row of paired rollers mounted on the main frame and disposing therebetween, each first beam of the movable frame in rolling contact therewith, and the carrier has on each side thereof plural sets of paired rollers disposing therebetween each second beam of the movable frame in rolling contact therewith.

According to another preferred form of the invention, each first beam of at least one of the movable frames is formed therethrough with a coaxial cylinderical bore for slidably receiving a piston thereby constituting the first cylinder and the piston has at least one piston rod held at its free end stationarily with respect to the main frame.

According to still another preferred form of the invention, the second cylinder consists of a cylinder barrel extending in parallel with the second beam and securely mounted on the carrier and a piston slidably received in the cylinder barrel and having at least one piston rod stationarily held at its free end on the movable frame.

The above and other objects, features and advantages of the invention will become clear from the following description of the preferred embodiment taken in conjunction with the accompanying drawings.

DESCRIPTION OF THE PREFERRED EMBODIMENT

Figure 1:
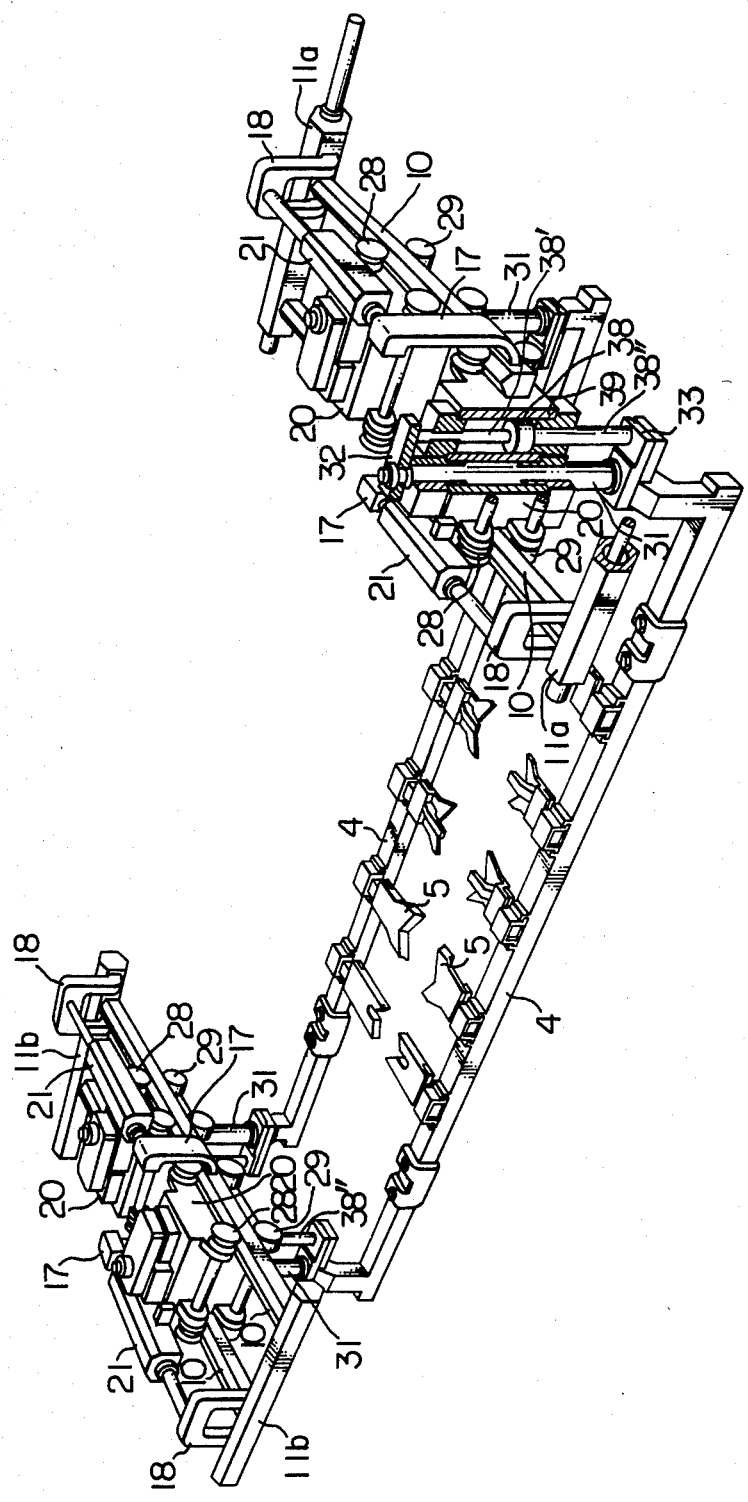
FIG. 1 is a perspective view of an embodiment of the invention.

FIG. 1 generally shows an assembly which constitutes the major part of a transfer machine in accordance with the invention. This assembly is adapted to be mounted on a press frame 1 which is diagramatically shown by two-dots-and-dash line in FIGS. 2 thru 4. Side openings 2 are formed in the upright portions provided at both side portions of the press frame 1. These side openings 2 constitute an entrance for a billet to be press-worked and an exit for a forged article.

Figure 2:
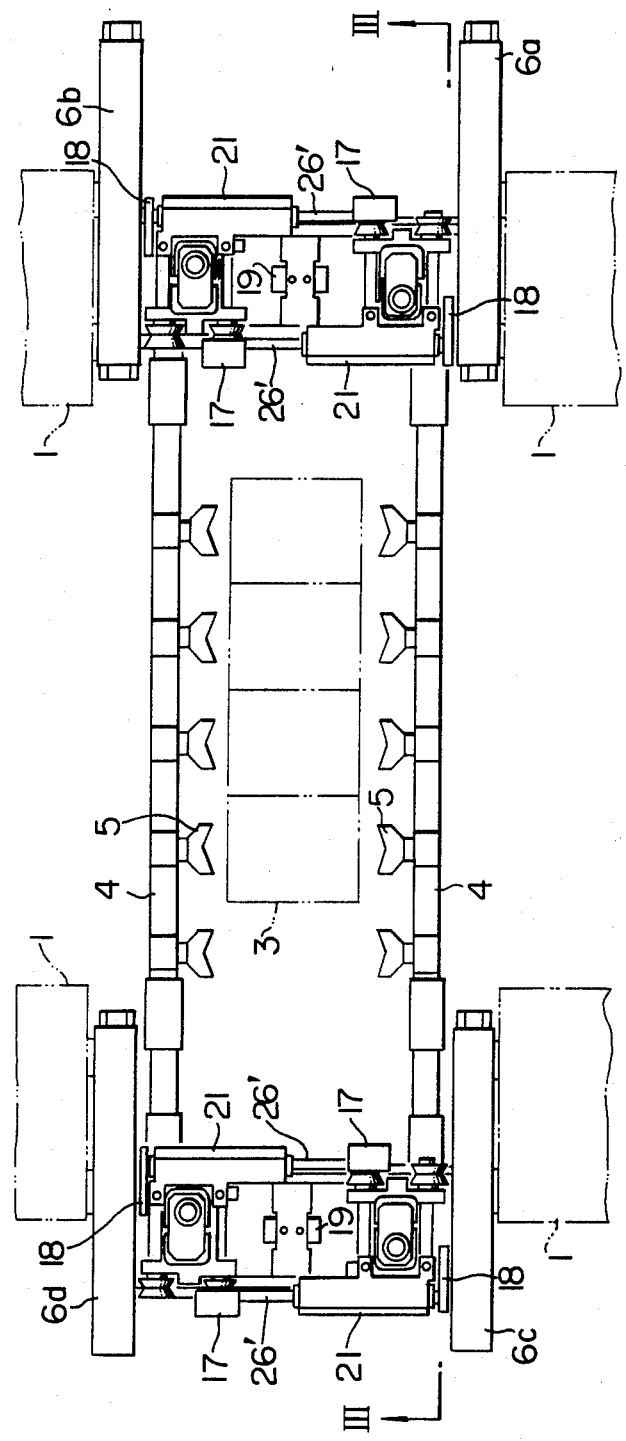
FIG. 2 is a plan view of the embodiment as shown in FIG. 1.
Figure 3:
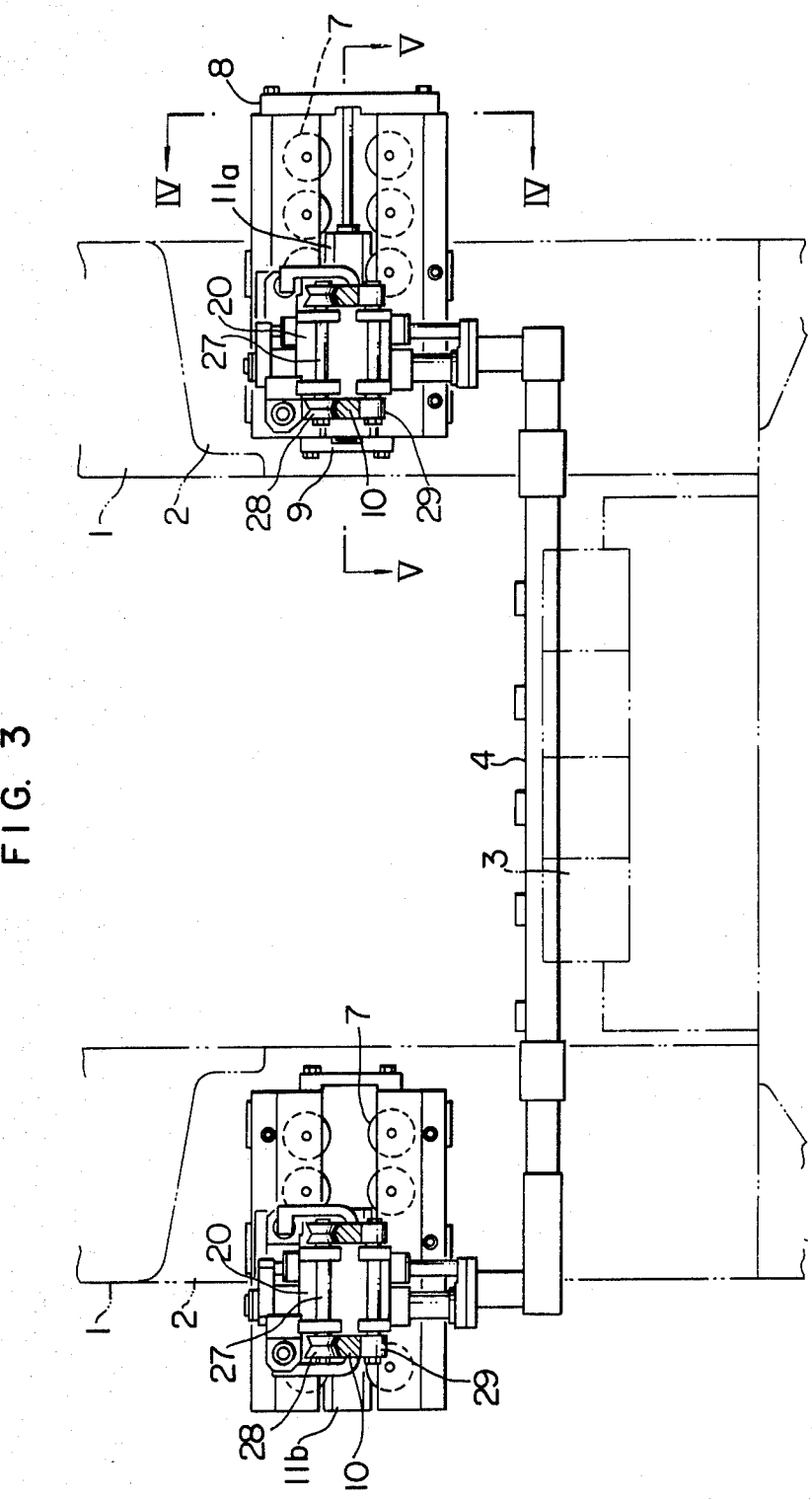
FIG. 3 is a front elevational view taken along the line III—III of FIG. 2.
Figure 4:
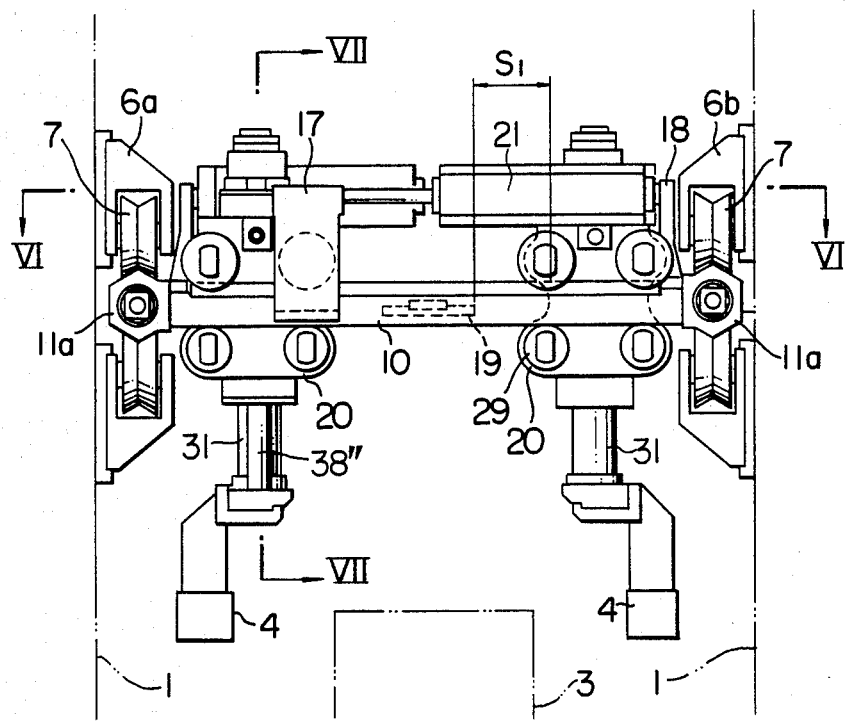
FIG. 4 is a side elevational view taken along the line IV—IV of FIG. 3.

A pair of parallel feed bars 4 extend above a series of dies 3 which are shown by two-dots-and-dash line in FIGS. 2 thru 4. Each of the feed bars carry a plurality of claws or jaws 5, the number of which is greater by one than the number of the dies. The arrangement is such that, as the feed bars 4 make three dimensional movements by the operation of a driving mechanism which will be described later, blanks on the dies are clamped by pairs of opposing claws and are fed intermittently to the next dies.

Four roller supports 6a, 6b, 6c and 6d are secured by bolts to two opposing vertical walls of the side openings 2 provided in the press frame 1. Each roller support rotatably carries a plurality of rollers 7 arrayed in horizontal direction in two rows, each roller having a V-shaped peripheral groove. For a reason which will be described later, stopper plates 8, 9 are secured to both ends of the roller supports 6a, 6b secured to one of the side openings.

A first beam 11a or 11b having a hexagonal cross-section is extended through the gap between two rows of rollers 7 and supported by these rollers 7 for free horizontal movement. Two first beams 11a, 11a or 11b, 11b opposing to each other are connected to each other by two second beams 10, 10 perpendicular thereto and each having a pentagonal cross-section. These two first beams and two second beams in combination constitute a movable frame which is movable in the longitudinal direction of the feed bars 4.

Figure 5:
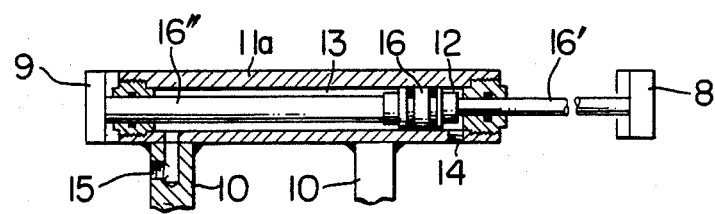
FIG. 5 is a sectional view of a first beam of the movable frame of the transfer machine taken along the line V—V of FIG. 3, showing particularly that the first beam constitutes an advance/return cylinder.

Each of the first beams 11a, 11a in one of the two movable frames (movable frame shown at right side in each Figure) has a longitudinal bore extending therethrough as shown in FIG. 5. The bore slidably receives a piston 16 which defines at its both sides cylinder chambers 12 and 13. Thus, each first beam 11a and the associated piston 16 in combination form a hydraulic cylinder. The supply of the working fluid into the cylinder chambers 12 and 13 is made through respective fluid supply ports 14 and 15. Piston rods 16' and 16" are connected to respective ends of each piston 16. The free ends of these piston rods 16', 16" are adapted to make contact with the stopper plates 8 and 9 mentioned before. Although the first beams 11b, 11b of the other movable frame are solid in the illustrated embodiment, these beams 11b, 11b may constitute hydraulic cylinders as in the case of the first beams 11a, 11a of the first-mentioned movable frame.

Two carriers 20 mounted on the second beams 10, 10 of each movable frame are adapted to move along these second beams 10, 10. Each carrier 20 is provided at each side thereof with two upper rollers 28 and two lower rollers 29. Two rollers 28 or 29 at the both sides are connected through a shaft 27. The upper rollers 28 have V-shaped peripheral grooves by which they make rolling contact with the mountain-shaped upper surface of each second beam 10, while the lower rollers 29 have flat peripheral surfaces which make rolling contact with flat lower surface of each second beam 10. The carriers 20, 20, therefore, are movable on respective movable frames 10 in the direction perpendicular to the direction of movement of the movable frames. The second beams 10, 10 on each movable frame are connected to each other at their mid portions through a connecting plate to which fixed by bolts is a stopper 19 adapted for limiting the movement of two carriers 20, 20 toward each other.

Each carrier 20 carries a hydraulic cylinder 21 which extends in parallel with the second beam 10. As will be seen from FIG. 6, the cylinder 21 slidably receives a piston 26 which defines at its both sides cylinder chambers 22 and 23 to and from which hydraulic oil is charged and discharged through respective supply ports 24, 25. Piston rods 26', 26" are connected to respective ends of the piston 26. These piston rods 26', 26" at their other ends make contact with a holder bracket 17 fixed to the second beam 10 and a holder bracket 18 fixed to the first beam 11a or 11b, respectively.

Each carrier 20 has a pair of guide bushes 30, namely, an upper guide bush and a lower guide bush. A lift rod 31 is slidably received by these guide bushes. The carrier 20 is provided also with a vertical hydraulic cylinder 39 secured thereto in parallel with the lift rod 31. The cylinder 39 slidably receives a piston 38 at the upper and lower sides of which defined are cylinder chambers 34 and 35 to and from which hydraulic oil is charged and discharged through respective supply ports 36 and 37. Piston rods 38', 38" connected to the upper and lower ends of the piston 38 make contact at their other ends with holder plates 32 and 33 fixed to the upper and lower ends of the lift rod 31. The lower end of the lift rod 31 is connected to the end of the feed bar 4.

The apparatus of the invention for transferring articles has the construction described hereinbefore. In operation, three dimensional movements of the feed bars 4 and claws 5 are achieved in a manner explained hereinbelow.

Figure 6:
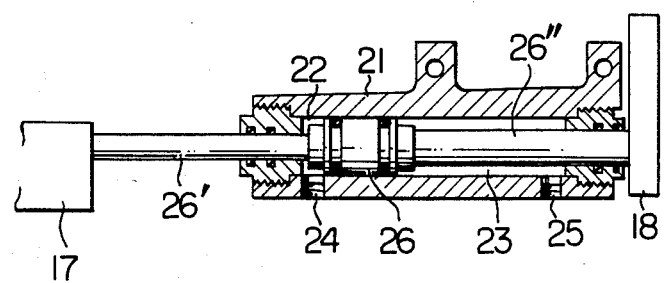
FIG. 6 is a sectional view of a clamp/unclamp cylinder taken along the line VI—VI of FIG. 4.

For effecting a clamping operation, hydraulic oil is charged into the cylinder chamber 22 of each clamp cylinder 21 through the associated supply port 24 shown in FIG. 6. In consequence, a force is generated by the hydraulic pressure to tend to displace the piston 26 to the right as viewed in FIG. 6. Since the piston 26 is fixed at its both ends to the holding brackets 17, 18 through the piston rods 26', 26", this force acts to displace the cylinder 21 to the left as viewed in FIG. 6. Since the clamp cylinder 21 is fixed to the carrier 20 by means of the bolts, the carrier 20 moves along the second beams 10 while the rollers 28 and 29 roll on the latter. A hydraulic circuit not shown is arranged such that four clamp cylinders 21 operate the associated carriers 20 in synchronization so that the two opposed carriers 20 on each movable frame are moved towards each other and thus the feed bars 4, which are secured to the carriers 20 on the two movable frames through the lift rods 31, are moved towards each other thereby to permit the claws 5 to clamp the articles. The movement of the carriers 20 toward each other on each movable frame is limited by the stopper 19, so that the stroke $S_1$ of each feed bar for clamping is determined accurately.

The unclamping operation is made by charging the hydraulic oil through the supplying port 25 of each hydraulic cylinder 21, so that the clamp cylinder 21 is moved to the right as viewed in FIG. 6 so that two feed bars 4 are moved away from each other to unclamp the articles.

The lifting operation is achieved in a manner explained hereinafter.

Figure 7:
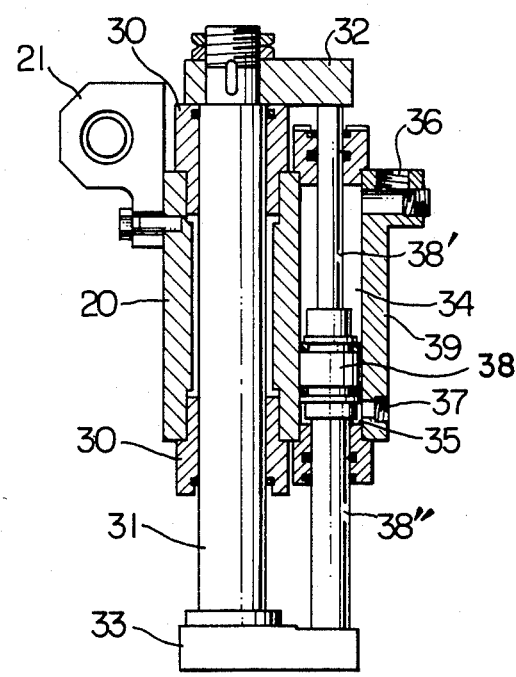
FIG. 7 is a sectional view of a lift/down cylinder taken along the line VII—VII of FIG. 4.

As the hydraulic oil is supplied through the supply port 37 of each cylinder 39, the piston 38 is moved upwardly as viewed in FIG. 7. In consequence, the feed bars 4 are lifted to lift the articles clamped by the claws 5. To the contrary, the feed bars 4 are moved downward as the hydraulic cylinder 39 is charged with hydraulic oil through the supply port 36. During this vertical movement of the feed bars, the lift rods 31 slide in the guide bushes 30 so as to be guided by the latter.

The advancing operation of the feed bars is achieved in the following manner.

As the hydraulic oil is charged through the supply port 14 of each cylinder constituted by each first beam 11a, the first beam 11a is moved to the right as viewed in FIG. 5 because the piston 16 received by the cylinder is fixed to the stopper plates 8 and 9 through piston rods 16', 16''. Since the first beams 11a and the second beams 10 are connected rigidly to form the movable frame, the carriers 20 mounted on the second beams through rollers 28 and, hence, the lift rods 31 are moved simultaneously, so that the feed bars 4 secured to the lower ends of the lift rods are moved in the longitudinal direction thereof to effect the advancing motion. The returning of the feed bars is made by charging the hydraulic oil through the supply ports 15 of the cylinders constituted by the first beams 11a. The supply and discharge of hydraulic oil to and from these cylinders are made in synchronism to match for the operation of the feed bars 4 and claws 5.

As will be understood from the foregoing description, in the apparatus of the invention, the three dimensional movements of the feed bars are achieved entirely by the operation of the fluid-operated cylinders mounted on the press frame. It is, therefore, possible to reduce the length and weight of the feed bars and also to realize a compact and light-weight construction of the machine. Furthermore, the transfer of the billets into the press and transfer of the forged products out of the press are very much facilitated because open spaces are left at both sides of the press. The opened spaces left at both sides of the press also permit an easy access to facilitate operation and maintenance.

Although the invention has been described through specific terms, it is to be noted that the described embodiment is not exclusive and various changes and modifications may be imparted thereto. For instance, the piston of each cylinder may have only one piston rod which if fixed by a suitable means to a stationary part while permitting the cylinder to move. It will be clear to those skilled in the art that such an arrangement offers the same advantage as that described hereinbefore. Other changes and modifications are possible without departing from the scope of the invention which is limited solely by the appended claims.

What is claimed is:

1. An apparatus for transferring articles comprising:
a stationary main frame;
a pair of substantially parallel feed bars;
at least one pair of opposed jaws or claws adapted to hold said article therebetween, each said jaw or claw being provided on each said feed bar;
a pair of movable frames, each being movable with respect to said main frame in a plane in parallel with a plane in which said feed bars extend and including a pair of first beams extending in parallel with said feed bars and a pair of second beams extending perpendicularly to and securely fixed at their ends to said first beams;
a plurality of paired means mounted on said main frame for guiding said first beams, respectively, of each said movable frame to move said movable frame in the direction in parallel with said feed bars;
a pair of carriers movably supported on said second beams of each said movable frame for movement in the direction perpendicular to the movement of said movable frame;
a supporting member movably supported on each said carrier for movement in the direction perpendicular to said plane and securely supporting each end of each said feed bar;
at least one first fluid-operated cylinder for driving at least one of said movable frames;
a second fluid-operated cylinder for driving each said carrier; and
a third fluid-operated cylinder for driving each said supporting member.

2. An apparatus according to claim 1, wherein said guide means comprises a row of paired rollers mounted on said main frame and disposing therebetween each said first beam of said movable frame in rolling contact therewith and said carrier has on each side thereof plural sets of paired rollers disposing therebetween each said second beam of said movable frame in rolling contact therewith.

3. An apparatus according to claim 2, wherein each said first beam of at least one of said movable frames has a coaxial cylinder bore formed therethrough and a piston slidably disposed within the bore, and said piston has at least one piston rod held at its free end stationarily with respect to said main frame.

4. An apparatus according to claim 2 or 3, wherein said second cylinder consists of a cylinder barrel extending in parallel with said second beam and securely mounted on said carrier and a piston slidably received in said cylinder barrel and having at least one piston rod stationarily held at its free end of said movable frame.

* * * * *